United States Patent [19]

Kimbrough et al.

[11] Patent Number: 5,558,350
[45] Date of Patent: Sep. 24, 1996

[54] STEERING CONTROL SYSTEM FOR TRAILERS

[75] Inventors: Scott S. Kimbrough; R. Scott Vincent, both of Salt Lake City, Utah

[73] Assignee: University of Utah Research Foundation, Salt Lake City, Utah

[21] Appl. No.: 197,010

[22] Filed: Feb. 15, 1994

Related U.S. Application Data

[63] Continuation of Ser. No. 703,612, May 21, 1991, abandoned.

[51] Int. Cl.⁶ ..................................................... B62D 13/04
[52] U.S. Cl. ......................... 280/426; 280/432; 280/442; 280/511; 340/431
[58] Field of Search ................................... 280/432, 419, 280/420, 422, 426, 455.1, 459, 506, 511; 340/870.38, 431, 687; 324/609, 714; 73/1 E

[56] References Cited

U.S. PATENT DOCUMENTS

| | | | |
|---|---|---|---|
| 3,825,921 | 7/1974 | Marus et al. | 340/431 |
| 3,833,928 | 9/1974 | Gavit et al. | 340/431 |
| 3,947,839 | 3/1976 | Zigmant | 340/431 |
| 4,122,390 | 10/1978 | Kollitz et al. | 280/432 |

Primary Examiner—Anne Marie Boehler
Attorney, Agent, or Firm—Jon C. Christiansen; Daniel McCarthy

[57] ABSTRACT

An angle sensor for measuring an angle θ between two rigid bodies rotatably joined at a joint. The angle sensor includes an indicator disk, an anchor strap and a mechanism for reading the indicator disk. Our invention also includes forward and backward motion steering control systems which can employ the angle sensor as a hitch angle sensor to measure the hitch angle between a tow vehicle and a trailer.

3 Claims, 9 Drawing Sheets

STEERING CONTROL SYSTEM FOR TRAILERS

This application is a continuation of Ser. No. 07/703,612, filed May 21, 1991, which is now abandoned.

Towing trailers can produce stability and maneuverability problems. A tow-vehicle/trailer combination becomes less stable as velocity increases; the eigenvalues of the system move towards the imaginary axis and become less damped as velocity increases. Lane changes or external disturbances induce yaw oscillations in the trailer. Moreover, it is difficult to negotiate tight corners or to back-up when towing a trailer. All of these undesirable effects can be mitigated by steering the wheels of the trailer.

Other researchers have studied the dynamics of tow-vehicle/trailer combinations. One researcher has explored the benefits of steering the rear trailer wheels of large tractor/trailer combinations using a control law which was a speed dependent function of hitch angle. This control strategy was shown to enhance low speed followability and high speed transient response. Other researchers have explored the benefits of steering the wheels of utility trailers for increasing the stability of forward motion; they used root locus techniques to find appropriate proportional and derivative gains to be applied to hitch angle.

Our invention provides the benefits of a more comprehensive control strategy than any previously formulated. This control strategy considers both forward and backward motion. The objectives of our invention include solving the problems described above and otherwise improving the performance of vehicle systems. Our invention can enhance the performance of skilled and experienced drivers and can help inexperienced drivers.

Our invention relates to a steering control system for trailers and to a hitch angle sensor that can be used as part of such steering control system. More particularly, our invention includes a forward motion steering control system for controlling the steering of a trailer towed by a tow vehicle in a forward direction which can improve the stability, maneuverability and followability of the trailer and tow vehicle. Our invention also includes a backward motion steering control system for controlling the steering of a trailer pushed by a tow vehicle in a backward direction which can improve the stability of the trailer and tow vehicle (i.e. reduce jackknifing) and improve maneuverability. The hitch angle sensor of our invention provides a means for measuring the hitch angle between the trailer and tow vehicle and can be used with the forward motion steering control system or the backward motion steering control system or for other purposes.

The objectives, aspects and advantages of our invention are apparent from this description including the appended drawings.

SUMMARY OF INVENTION

Our invention is a steering system and includes an angle sensor which can be used for sensing trailer hitch angles, a forward motion steering control system, and a backward motion steering control system.

Figure 14:
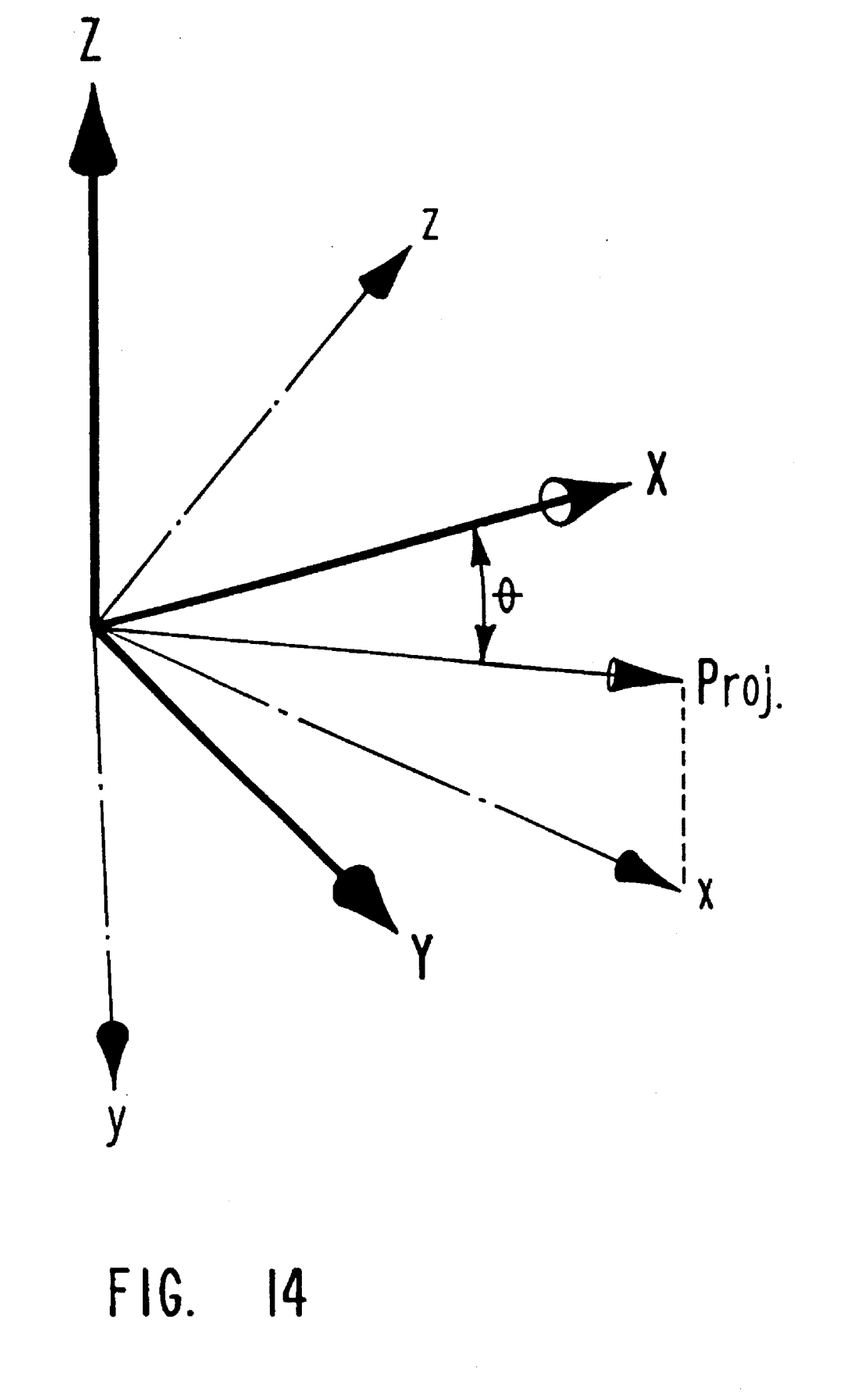
FIG. 14 depicts an angle $\ominus$ in coordinate systems XYZ and xyz.

The angle sensor of our invention is a means for sensing the projected angle $\Theta$ between the longitudinal axis X of a first rigid body (e.g. a tow vehicle) and the projected longitudinal axis x of a second rigid body (e.g. a trailer towed by the tow vehicle), where the second body is rotatably joined to the first body at a joint. FIG. 14 depicts angle $\Theta$ which is defined as the angle between the longitudinal axis X and the projection of the longitudinal axis x into the XY plane. The projection is identified as "Proj." in FIG. 14. The angle $\Theta$ can be the hitch angle between a tow vehicle and a trailer towed by the tow vehicle.

To better understand the invention, a coordinate system XYZ is assigned to the first body (e.g. tow vehicle) and a coordinate system xyz is assigned to the second body (e.g. trailer). See, for example, FIG. 4. As indicated above, the X-axis represents the longitudinal axis of the first body (e.g. tow vehicle) and the x-axis represents the longitudinal axis of the second body (e.g. trailer). The Y-axis and y-axis represent the lateral axes of the first and second bodies respectively. The Z-axis and z-axis represent the vertical axes of the first and second bodies respectively. This convention is followed in this description of our invention and in the appended claims.

As applied to a vehicle system formed by a tow vehicle and a trailer (see, for example, FIG. 1), the angle sensor of our invention is a hitch angle sensor. The hitch angle sensor includes an indicator disk which is rotatably attached to the joint of the first body. The indicator disk can be any means for indicating angle $\Theta$ (for example, it can be an index). An anchor strap is attached to the indicator disk and to the trailer.

The anchor strap is flexible in bending about the y-axis and in twisting about the x-axis but resists bending about the z-axis. A thin, long but relatively wide strap satisfies these requirements. The anchor strap performs the following functions:

(1) It forces the indicator disk to return to a $\Theta=0$ position whenever the x-axis lies in the XZ plane.

(2) It allows twisting of the trailer about the x-axis without rotation of the indicator disk about the Z-axis.

(3) It allows bending of the trailer about the y-axis without rotation of the indicator disk about the Z-axis.

(4) It resists bending about the z-axis.

The anchor strap can be any means for achieving these functions. The net result of these functions is that the indicator disk rotates only in response to changes in the angle between the X-axis and the projection of the x-axis into the XY plane. This angle is angle $\Theta$ and, for the vehicle system, is the hitch angle. The hitch angle can be read from the indicator disk by a reading means. Conventional reading means such as an optical encoder, potentiometer, etc. can be used for this purpose.

Without the anchor strap the indicator disk would not necessarily return to the same position when the trailer is returned to the same orientation relative to the tow vehicle. In fact, it is possible to make the indicator disk rotate continuously in one direction by making certain combined rotations of the trailer, even through the trailer returns to the same orientation during each cycle of these rotations.

As is readily recognized by persons of ordinary skill in the art, the angle sensor of our invention has application to rigid bodies other than a tow vehicle and trailer and our invention is intended to encompass such other applications, including robotics, manufacturing, etc. With respect to such other applications, the assignment and orientation of the XYZ and xyz axes is arbitrary, e.g., the X-axis and x-axis, for such other applications, are not necessarily longitudinal axes.

The forward motion control system of our invention can be used to steer the wheels of a trailer towed by a tow vehicle in a forward direction. The control system includes a means for monitoring the steering angles $d_t$ of the trailer wheels, a means for repeatedly calculating a desired reference state for the vehicle system, a means for repeatedly calculating desired steering angles $d_{t,command}$ for the trailer wheels that will bring the vehicle system towards the desired reference state, and a means for repeatedly adjusting the steering angles $d_t$ in response to $d_{t,command}$ to bring the vehicle system near the desired reference state and to maintain the vehicle system near the desired reference state. The desired reference state can be, for example, a state that will improve stability, maneuverability and/or followability of the vehicle system. The steering command $d_{t,command}$ can be calculated from vehicle system conditions. The inventive control system can be implemented using sensors, a controller (and observer), and a servo loop. The sensors can include the above-described hitch angle sensor. The controller can be used to execute a major loop and a minor loop to calculate steering commands $d_{t,M}$ and $d_{t,m}$ which can be used to calculate $d_{t,commnd}$.

Conventional tow vehicle and trailer combinations suffer from both stability and maneuverability problems. As velocity increases, the tow vehicle and trailer become less stable because the eigenvalues of the system move toward the imaginary axis and become less damped. Lane changes and external disturbances induce yaw oscillations in the trailer further degrading control of the tow vehicle and trailer system. Our invention improves the stability and disturbance rejection properties of the vehicle system by application of the major loop steering command. The minor loop steering command improves low speed maneuverability and followability.

The backward motion control system of our invention can be used to steer the wheels of a trailer pushed by a tow vehicle in a backward direction. The control system includes a means for monitoring the steering angles $d_t$ of the trailer wheels, a means for monitoring a hitch angle $\ominus$, a means for repeatedly calculating a desired reference hitch angle $\ominus_r$ for the vehicle system, a means for repeatedly calculating desired steering angles $d_{t,c}$ for the trailer wheels that will bring the hitch angle $\ominus$ towards the desired reference hitch angle $\ominus_r$, and a means for repeatedly adjusting the steering angles $d_t$ in response to $d_{t,c}$ to bring the hitch angle $\ominus$ near the desired reference hitch angle $\ominus_r$ and to maintain the hitch angle $\ominus$ near the desired reference hitch angle $\ominus_r$. The desired reference hitch angle $\ominus_r$ can, for example, reduce jacknifing and/or improve maneuverability of the vehicle system. The steering command $d_{t,c}$ can be calculated from vehicle system conditions. The inventive control system can be implemented using sensors, a controller (and observer), and a servo loop. The sensors can include the above-described hitch angle sensor.

DETAILED DESCRIPTION OF INVENTION

HITCH ANGLE SENSOR

Figure 1:
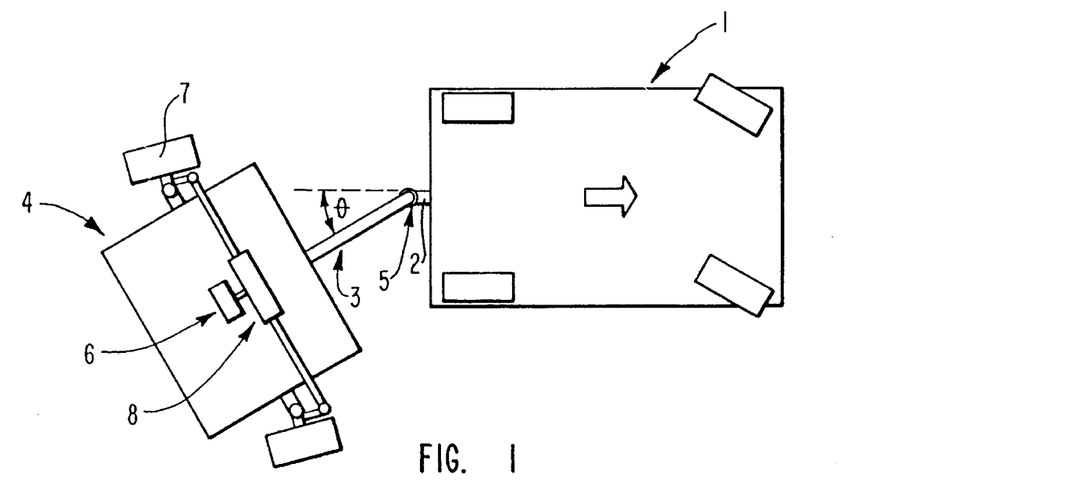
FIG. 1 depicts a tow vehicle and trailer combination which forms a vehicle system.

FIG. 1 depicts a tow vehicle 1 and trailer 4 embodying our invention. The tow vehicle 1 has a receiver 2 projecting from its rear to which the tongue 3 of the trailer 4 connects. The hitch angle sensor 5 is located at the point where the receiver 2 and the trailer tongue 3 join. On the trailer are located a steering controller/observer unit 6 which calculates a steering command for the trailer wheels 7, and a steering actuator unit 8 which adjusts the trailer wheels in response to the steering command. Hitch angle sensor 5 measures hitch angle $\ominus$. Hitch angle $\ominus$ is more precisely defined in FIG. 14.

Figure 2:
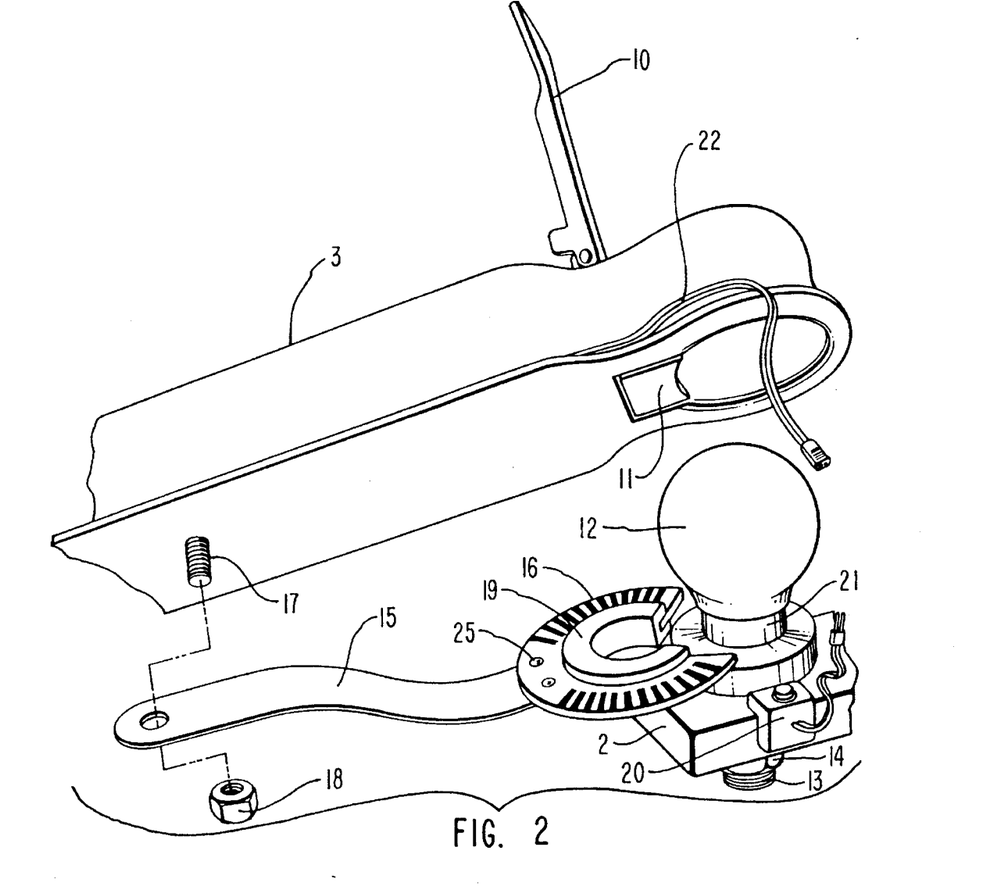
FIG. 2 depicts a mechanism for sensing trailer hitch angle, featuring an S-type anchor strap and an open indicator disk.

FIG. 2 illustrates the hitch angle sensor 5 in greater detail. The hitch angle sensor measures the angle $\ominus$ between the longitudinal axis of a tow vehicle and the projected longitudinal axis of a trailer joined by a ball joint (or other joint allowing rotation about three axes, but no translation). The trailer 4 is rotatably joined to tow vehicle at the joint of tow vehicle 1. The trailer's tongue 3 includes a clamp 10 and a locking device 11 as found on conventional trailer tongues. A hitch ball 12 is mounted on receiver 2 by means of a threaded shaft 13 and a hitch ball nut 14 as in conventional receiver and hitch ball assemblies. Hitch ball 12 includes a channeled area 21 comprised of antifriction material (e.g. nylon or teflon). Attached to trailer tongue 3 is an anchor strap 15 and indicator disk 16. The anchor strap 15 is attached to trailer tongue 3 via a threaded stud 17 and nut 18. The indicator disk 16 is attached to anchor strap 15 via rivets 25. The attachment of the indicator disk 16 to the anchor strap 15 and the anchor strap 15 to the trailer tongue 3 can also be accomplished via screws, welding, or other conventional means. The indicator disk 16 includes antifriction material 19 on its inner surface to facilitate rotational movement about channelled area 21 of the hitch ball 12.

The indicator disk 16 is a device used to indicate the hitch angle $\ominus$ of the vehicle system. The indicated hitch angle is read by a sensor 20. The sensor 20 can be an optical encoder, a potentiometer, or other conventional means such as a RVDT (rotary variable differential transformer) or LVDT (linear variable differential transformer) or any other means for reading the indicated hitch angle. Sensor 20 is mounted on receiver 2 of the tow vehicle and is connected by a wire 22 to the steering controller/observer unit 6.

When trailer tongue 3 and hitch ball 12 are connected, hitch ball 12 projects through the center of the indicator disk 16. The inside surface 19 of the indicator disk 16 is comprised of anti-friction material such as nylon or teflon to allow the indicator disk 16 complete freedom of movement about the channelled area 21 of the hitch ball 12. In its preferred embodiment, the indicator disk 16 carries no vertical load, so its rotation is completely unrestricted. Other embodiments of the invention may include an indicator disk subject to vertical load; in which case the indicator disk must be supported by thrust bearings or other means to maintain freedom of rotation. The indicator disk 16 has an opening (i.e. an open mouth) through which the disk can be attached to the joint. Because the disk 16 is an open disk, the trailer tongue 3 and hitch ball 12 may be connected and disconnected without any disassembly of the hitch ball 12 and receiver 2 assembly. Indicator disk 16 is an indexed component constrained to rotate about the Z-axis and located at the joint. The index is a means for indicating the orientation of the disk relative to the tow vehicle 1. Means other than an index can be used for this purpose and are within the scope of our invention.

The anchor strap 15 is affixed to trailer tongue 3 at one end and to indicator disk 16 at the other end. It is designed to be flexible in bending about the y-axis and in twisting about the x-axis, but rigid in bending about the z-axis. Our invention employs a thin, long, but relatively wide spring steel anchor strap 15. The anchor strap 15 shown in FIG. 1 is an S-type strap which accommodates pitch induced relative motion between the tow vehicle 1 and the trailer 4 by bending along its S-shape.

Figure 3:
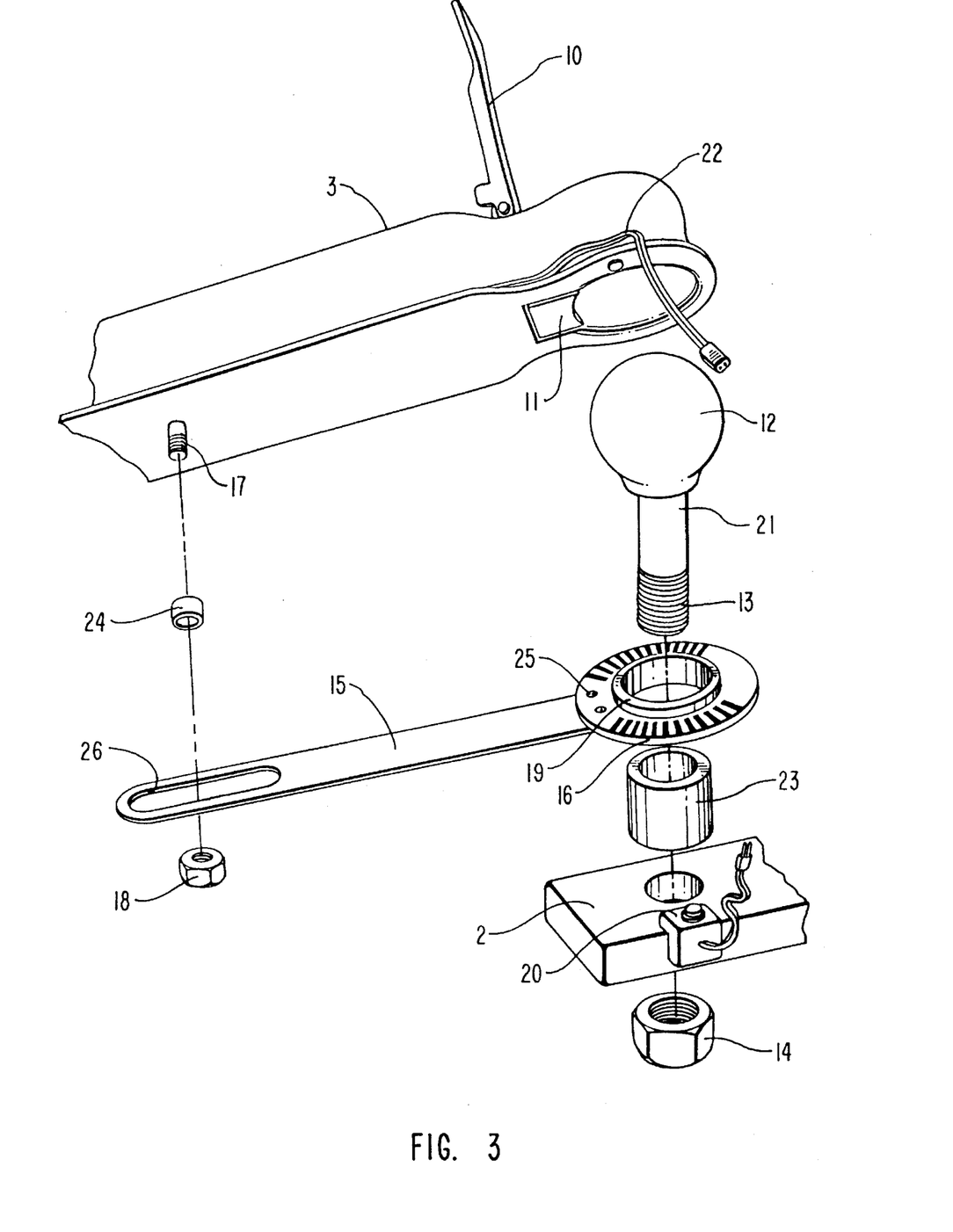
FIG. 3 depicts a mechanism for sensing trailer hitch angle, featuring a slotted anchor strap and a closed indicator disk.

FIG. 3 illustrates another embodiment of the hitch angle sensor 5. It performs the same function as the hitch angle sensor depicted in FIG. 2, but it includes differences in the hitch ball 12, anchor strap 15, and means for attaching to the receiver 2 of the tow vehicle 1. The tongue 3 includes a clamp 10 and a locking device 11 as found on conventional trailer tongues. A hitch ball 12 is mounted on the receiver 2 by means of a threaded shaft 13 and a hitch ball nut 14 as in conventional receiver and hitch ball assemblies. The hitch ball 12 includes antifriction material along its shaft 21. Attached to trailer tongue 3 is an anchor strap 15 and indicator disk 16 assembly. The anchor strap 15 in FIG. 3 is slotted and is attached to trailer tongue 3 via a threaded stud 17, a spacer 24, and a nut 18. The slotted anchor strap 15 accommodates pitch induced relative motion between tow vehicle 1 and trailer 4 by sliding longitudinally along its slot 26 on the threaded stud 17. The indicator disk 16 is attached to anchor strap 15 via rivets 25. The indicator disk 16 is similar to the indicator disk of FIG. 2 except it does not have an open mouth (i.e. it is a closed disk). The indicator disk 16 includes antifriction material 19 on its inner surface to facilitate rotational movement about channelled area 21 of the hitch ball 12. The hitch angle ⊖ is read from the indicator disk 16 by a sensor 20 mounted on receiver 2 and connected by a wire 22 to steering controller unit 6.

When trailer tongue 3 and the hitch ball 12 are connected, the hitch ball 12 projects through the center of the indicator disk 16. The inside surface 19 of the indicator disk 16 is composed of anti-friction material such as nylon or teflon to allow the indicator disk 16 complete freedom of rotation about the shaft 21 of the hitch ball 12. In its preferred embodiment, the indicator disk 16 carries no vertical load, so its movement is completely unrestricted. Other embodiments of the invention may include an indicator disk subject to vertical load; in which case the indicator disk MUST BE supported by thrust bearings or other means to maintain freedom of rotation. The indicator disk 16 depicted in FIG. 3 is a closed disk. The hitch ball 12 projects through the disk when assembled, continuing through a spacer 23, receiver 2, and fastened with a nut 14.

The anchor strap 15 is affixed to trailer tongue 3 at one end and to the indicator disk 16 at the other end of the strap. It is designed to be flexible in bending about the y-axis and in twisting about the x-axis, but rigid in bending about the z-axis. As in the previous example, a thin, long, but relatively wide spring steel anchor strap can be employed. The anchor strap 15 shown in FIG. 3 is a slotted-type strap which accommodates pitch induced relative motion between the tow vehicle 1 and the trailer 4 by sliding along its slot 26 on the threaded stud 17.

The use of an anchor strap is an improvement over the prior art because it results in a more accurate measurement of the hitch angle ⊖. When the vehicle system experiences relative pitching motion between the trailer and tow vehicle, the strap prevents rotation of the indicator disk about the Z-axis in response to that motion. When the vehicle system experiences relative roll motion between the trailer and tow vehicle, the strap prevents rotation of the indicator disk about the Z-axis in response to that motion. The prior art includes an indicator disk which is mounted on a rotating hitch ball but which is not attached to the trailer through an anchor strap. Such prior art configuration allows the indicator disk to rotate with the hitch ball in response to vertical (pitching) or twisting (rolling) movements between the tow vehicle and trailer that do not represent a change in the hitch angle ⊖. This results in an inaccurate measurement of the hitch angle ⊖.

Without the application of the anchor strap 15 or other means to secure the trailer tongue to the indicator disk 16, the indicator disk 16 may indicate a change in hitch angle ⊖ in response to relative movement between the tow vehicle 1 and the trailer 4 which is not a change in the hitch angle ⊖. Without an anchor strap 15, certain combined movements of the trailer tongue 3 can cause the indicator disk 16 to rotate in a full circle about the hitch ball 12. Absence of the anchor strap or other means to secure the trailer tongue to the indicator disk results in inaccurate measurement of the hitch angle.

The anchor strap 15 eliminates this problem by allowing pitching and rolling movements between the tow vehicle 1 and the trailer 4 to occur without any change in the indicated hitch angle ⊖.

The anchor strap does not necessarily have to be in the shape of a strap and, more broadly, can be any means or mechanism for attaching the indicator disk to the trailer which is flexible in bending about the y-axis (or,which allows for bending motion about the y-axis) and in twisting about the x-axis (or which allows for twisting about the x-axis), but resists bending about the z-axis, and which causes the indicator disk to return to a ⊖=0 position whenever the x-axis lies in the XZ plane. The hitch angle ⊖=0 when the x-axis of the trailer lies in the XZ plane. This means or mechanism should also accommodate the change in distance that occurs between its mounting point on the indicator disk and its mounting point on the trailer. (This change in distance occurs whenever there is relative pitching motion between the two connected bodies.) The S-shaped strap and the slotted strap are examples of how such pitching motion can be accomodated, but other means can be used in the practice of our invention.

The drawings depict two examples of the indicator disk of our invention. More broadly, the indicator disk can be any means (whether or not in the shape of a disk) which can indicate hitch angle ⊖, which is constrained to rotate about the Z-axis and which is located at the joint.

The terms anchor strap and indicator disk as used in this description of our invention and in the claims, are intended to encompass the broader meanings articulated above.

This hitch angle sensor can be used to measure the projected angle between any two rigid bodies joined at a joint, (e.g. ball joint, pintal hitch, etc.) and its use is not limited to vehicle systems. The hitch angle sensor can be used to provide a feedback signal for use by both the forward and backward motion steering systems in calculating trailer wheel steering commands. The hitch angle sensor also has potential application in braking systems.

FORWARD MOTION STEERING CONTROL SYSTEM

Figure 4:
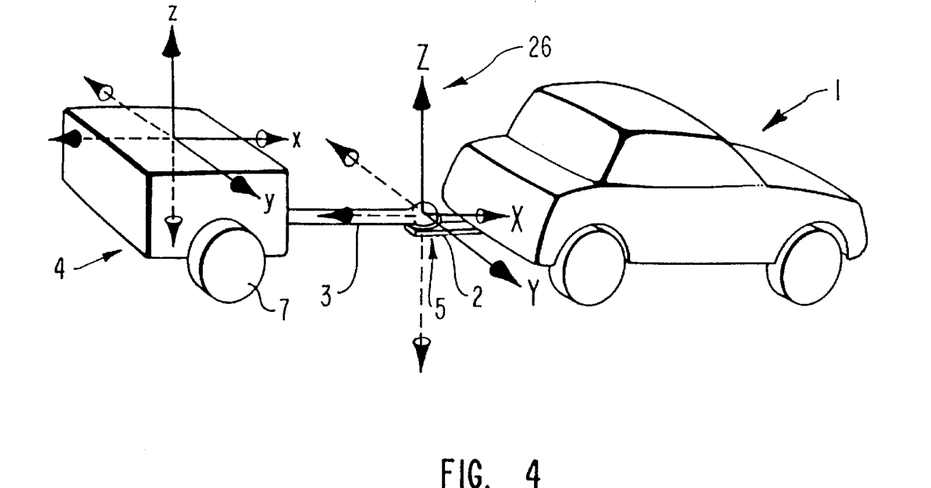
FIG. 4 depicts the coordinate systems used to describe the relationship between the tow vehicle and the trailer.

FIG. 4 illustrates a model of tow vehicle 1 and trailer 4 with labelled coordinate systems. The coordinate system designated X, Y, Z is the frame of reference for tow vehicle 1. The coordinate system designated x, y, z is the frame of reference for trailer 4. With respect to the tow vehicle, X denotes its longitudinal axis, Y denotes its lateral axis and Z denotes its vertical axis. With respect to the trailer, x denotes its longitudinal axis, y denotes its lateral axis and z denotes its vertical axis. This convention is followed in this description of our invention and in the claims. When the tow vehicle and trailer are referred to jointly, the term "vehicle system" is employed.

Figure 5:
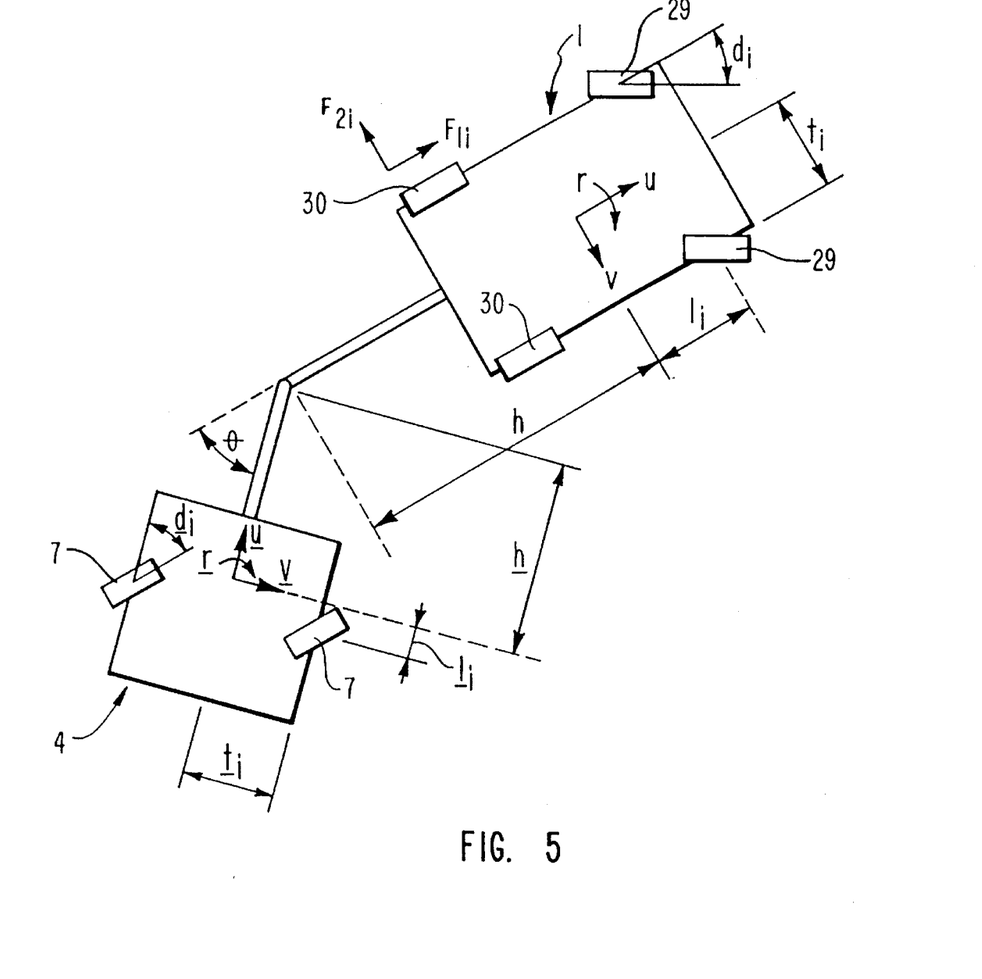
FIG. 5 depicts variables and dimension parameters which can be used in the forward motion steering control system.

FIG. 5 depicts angles and vectors upon which the parameters, variables and equations for a forward motion control system can be based.

The vehicle response variables representing tow vehicle and trailer dynamics are defined as:

u—longitudinal velocity of tow vehicle v—side-slip velocity of tow-vehicle r—yaw velocity of tow vehicle $\underline{u}$—longitudinal velocity of trailer $\underline{v}$—side-slip velocity of trailer $\underline{r}$—yaw velocity of trailer $\ominus$—hitch angle The steering variables are defined as:

$d_i$—the steering angle of tow vehicle wheel i ($d_c$ is the set of all steering angles of the tow vehicle)

$\underline{d_i}$—The steering angle of trailer wheel i ($\underline{d_t}$ is the set of all steering angles of the trailer).

The following vehicle system parameters are defined as:

$l_i$—the longitudinal distance from the tow vehicle center of gravity to its wheel i, where with respect to tow vehicle 1, wheel i is a wheel selected from wheels 29 and wheels 30 (l is the set of all $l_i$)

$t_i$—the lateral distance from the tow vehicle center of gravity to its wheel i (t is the set of all $t_i$)

h—the longitudinal distance from the tow vehicle center of gravity to the trailer coupling m—the mass of the tow vehicle I—the yaw moment of inertia of the tow vehicle $\underline{l_i}$—the longitudinal distance from the trailer center of gravity to its wheel i, where with respect to trailer 4, wheel i is selected from wheels 7 ($\underline{l}$ is the set of all $\underline{l_i}$)

$\underline{t_i}$—the lateral distance from the trailer center of gravity to its wheel i (t is the set of all $\underline{t_i}$)

$\underline{h}$—the longitudinal distance from the trailer center of gravity to the trailer coupling $\underline{m}$—the mass of the trailer $\underline{I}$—the yaw moment of inertia of the trailer We also need to define a notation for tire forces as follows:

$F_{1i}$—the tire force generated along the longitudinal axis of wheel i of the tow vehicle (the braking or accelerating force)

$F_{2i}$—the tire force generated along the perpendicular axis of wheel i of the tow vehicle (the cornering force)

$\underline{F_{1i}}$—the tire force generated along the longitudinal axis of wheel i of the trailer (the braking or accelerating force)

$\underline{F_{2i}}$—the tire force generated along the perpendicular axis of wheel i of the trailer (the cornering force).

[Note: The subscripts 1 and 2 are used here because the subscripts x and y refer to the longitudinal and lateral axis of the tow trailer.]

Each $F_{2i}$ is a function of its cornering stiffness $c_i$ and the vehicle system state. Each $\underline{F_{2i}}$ is a function of its corresponding stiffness $\underline{c_i}$ and the vehicle system state. The set of all $c_i$ is represented by c. The set of all $\underline{c_i}$ is represented by $\underline{c}$. The c and $\underline{c}$ are parameters which are descriptive of the tire/road interface.

Variables, parameters and tire forces associated with the trailer are underlined. The values of $l_i$, $t_i$, and h are positive when directed away from the tow vehicle center-of-gravity in the positive directions of the axis X, Y and Z. The values of $\underline{l_i}$, $\underline{t_i}$, and $\underline{h}$ are positive when directed away from the trailer center-of-gravity in the positive directions of the axis x, y and z. Vehicle response variables can be selected to define a vehicle system state. In this embodiment of the invention, the vehicle system state is defined by u, v, r, $\underline{r}$ and $\ominus$. Such selected vehicle response variables are the state variables selected to define the vehicle system state. The vehicle system state can be defined in terms of other state variables. A vehicle system state can be defined using variables selected from the vehicle response variables listed above (i.e. u, v, r, $\underline{u}$, $\underline{v}$, $\underline{r}$, and $\ominus$) and shown on FIG. 5 and/or other vehicle response variables. Parameters can be input into a controller/observer unit 6 when the vehicle system is initialized. They can also be identified in real-time by various parameter estimation algorithms. Variables are monitored. Monitoring can be accomplished, for example, indirectly by calculation based on measurements from sensors or directly by measurement from sensors. Monitoring of the vehicle system state (or other variables or conditions) can be accomplished, for example, as follows:

(1) Directly by measurement of the state variable (or other variable or condition); and/or (2) Indirectly by measurement of a subset of the vehicle system state (or other variable or condition) and further processing by an observer (e.g. a Kalman filter) which produces an estimate of the vehicle system state (or other variable or condition).

In every calculation requiring the vehicle system state variables (or other variables or conditions), the estimates of these state variables (or other variables or conditions) provided by method (2) can be used in place of directly measured state variables (i.e. any state variable and its estimate are interchangeable in the calculations). Our invention and the appended claims are intended to encompass both estimates and direct measurements.

The vehicle response variables, steering variables, vehicle system parameters and parameters descriptive of the tire/road interface (e.g. c and $\underline{c}$) are examples of vehicle system conditions that can be used in the practice of our invention to calculate the desired steering angles ($d_{i,command}$) of the trailer wheels. Depending upon the equations or functions used to calculate the desired steering angles, the necessary vehicle system conditions can be selected from above and/or other vehicle system conditions can be selected. The above c and $\underline{c}$ are examples of parameters which are descriptive of tire/road interface properties and which can be included among the vehicle system conditions used to calculate the desired steering angle of the trailer wheel. This is done in the below described embodiment of our invention by using c, $\underline{c}$ and the vehicle system state to calculate the tire forces. These tire forces are used in the calculation of $d_{i,command}$.

Figure 6:
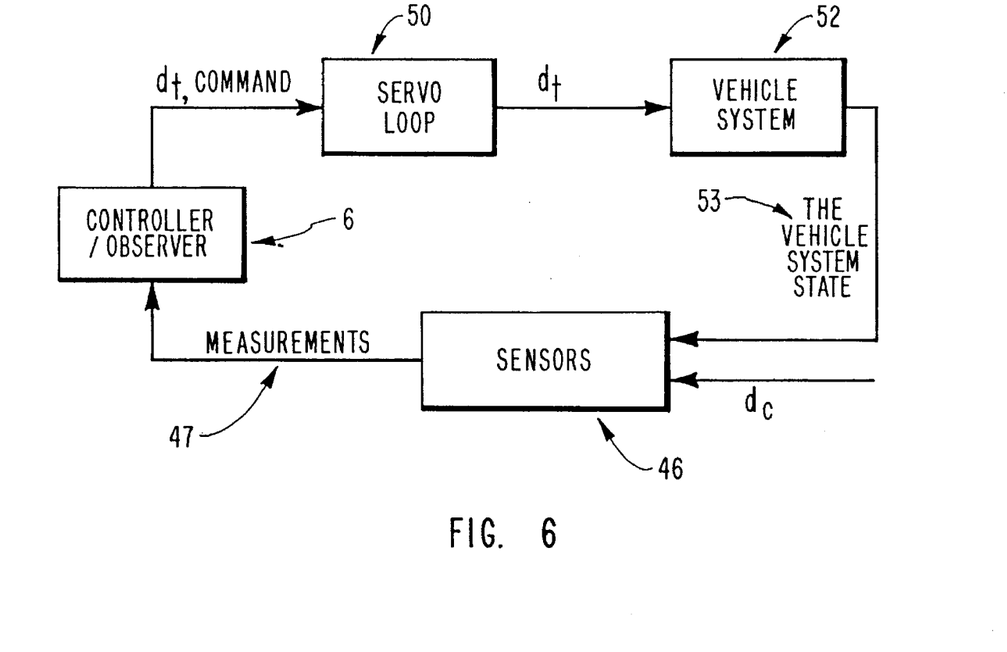
FIG. 6 depicts a control loop for the forward motion steering control system.

FIG. 6 depicts the data flow used in calculating and executing the steering command $d_{t,command}$. Steering command $d_{t,command}$ is comprised of the desired steering angles (or representations thereof) of the trailer wheels that will bring the vehicle system towards a desired reference state. The desired reference state can be a vehicle system state that will improve performance of the vehicle system (e.g. improved stability, maneuverability and/or followability). The vehicle system state 53 is monitored from the vehicle system 52 by sensors 46 (i.e. variable states of the vehicle system state are selected for monitoring). Monitoring can be accomplished by sensing or by calculation. In this manner the vehicle system state is continuously monitored. Measurements 47 (i.e. $d_c$, measurements of the state variables, or combinations thereof, sensed by sensors 46) are transmitted to controller/observer 6 which calculates the major and minor loop steering commands ($d_{t,M}$ and $d_{t,m}$) which are used to calculate steering command $d_{t,command}$. In making this calculation, controller/observer 6 first calculates the desired reference state. Steering command $d_{t,command}$ is transmitted to servo loop 50 for execution. The steering angles $d_c$ of the tow vehicle wheels are also sensed and provided as measurements to controller/observer 6. In lieu of steering angles, $d_c$ can represent the rotation angle of any component linked to the tow vehicle's wheels, or any other indirect representation of steering angle. Servo loop 50 adjusts the steering angles $d_t$ in response to $d_{t,command}$ to bring the vehicle system to the desired reference state. The actions or steps depicted in FIG. 6 are repeated to maintain the vehicle system near the desired reference state which changes with time. In this manner, the stability, maneuverability and followability of the vehicle system can be improved and maintained.

Figure 7:
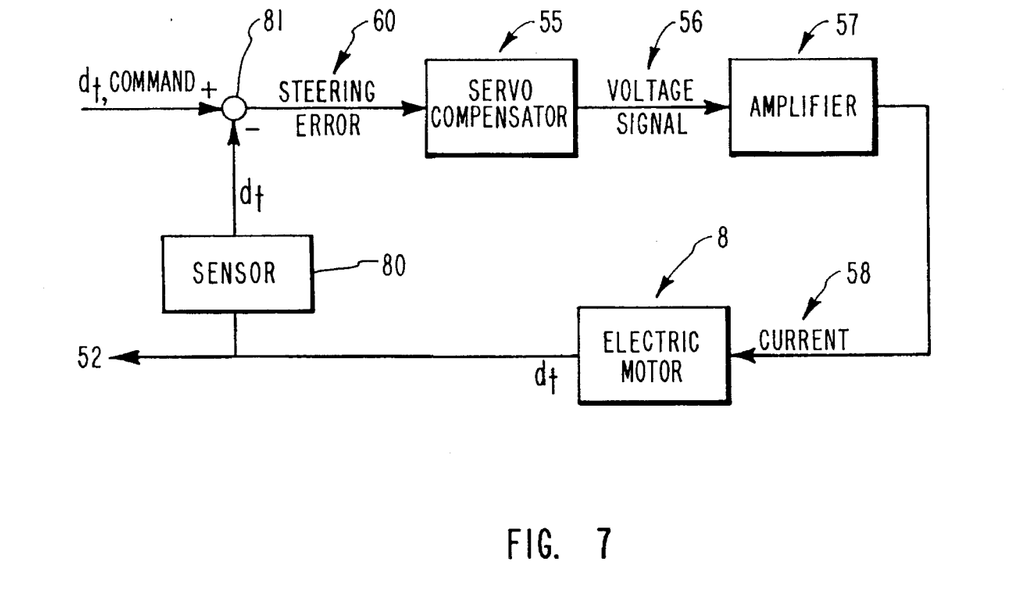
FIG. 7 depicts a servo loop which executes the steering commands issued as a result of the major and minor loops of the forward motion steering control system.

FIG. 7 depicts servo loop 50. The servo loop receives a steering command $d_{t,command}$ from controller/observer 6. A steering error 60 is determined by an operational amplifier 81 (or other means) which compares $d_{t,command}$ and with $d_t$, the actual steering angles of the trailer wheels 7 (and shown as $\underline{d}_t$ in FIG. 5). The steering error ($d_{t,command}$–$d_t$) is sent as a voltage signal to servo compensator 55. Servo compensator 55 acts upon the steering error to generate a voltage signal 56. An amplifier 57 buffers the voltage signal 56 and sends electrical current 58 to an electric motor 8 which adjusts trailer wheels 7 by an amount necessary to achieve the desired steering angle. The servo loop performs these steps repeatedly in an attempt to follow the steering command $d_{t,command}$, which is repeatedly calculated by controller/observer 6. Sensor 80 senses the new $d_t$ established by electric motor 8.

Figure 8:
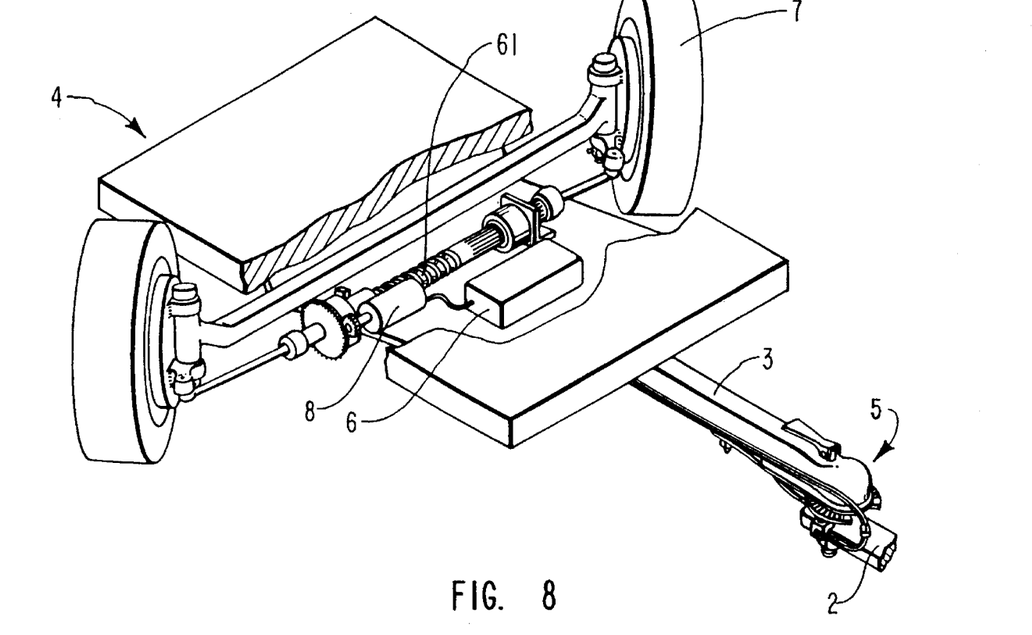
FIG. 8 depicts the trailer with hitch angle sensor, steering controller, and steering actuator units shown.

FIG. 8 depicts the physical effect of the steering commands. Steering controller/observer 6 calculates a steering command $d_{t,command}$ which is sent to servo loop 50. In servo loop 50, electric motor 8 executes the steering adjustment based on the steering error 60 by adjusting the trailer wheels 7 to the desired steering angle. The desired steering angle is intended to bring the vehicle system towards a desired vehicle system state (i.e. to the desired reference state). Electric motor 8 adjusts trailer wheels 7 by using a conventional recirculating ball and worm gear assembly 61. The steering adjustment can be accomplished by a steering actuator adjusting only one wheel, with a means employed to cause the movement of the other wheel(s) in synchronization with the first. A tie rod, hydraulic system, or other means can accomplish this.

Figure 9:
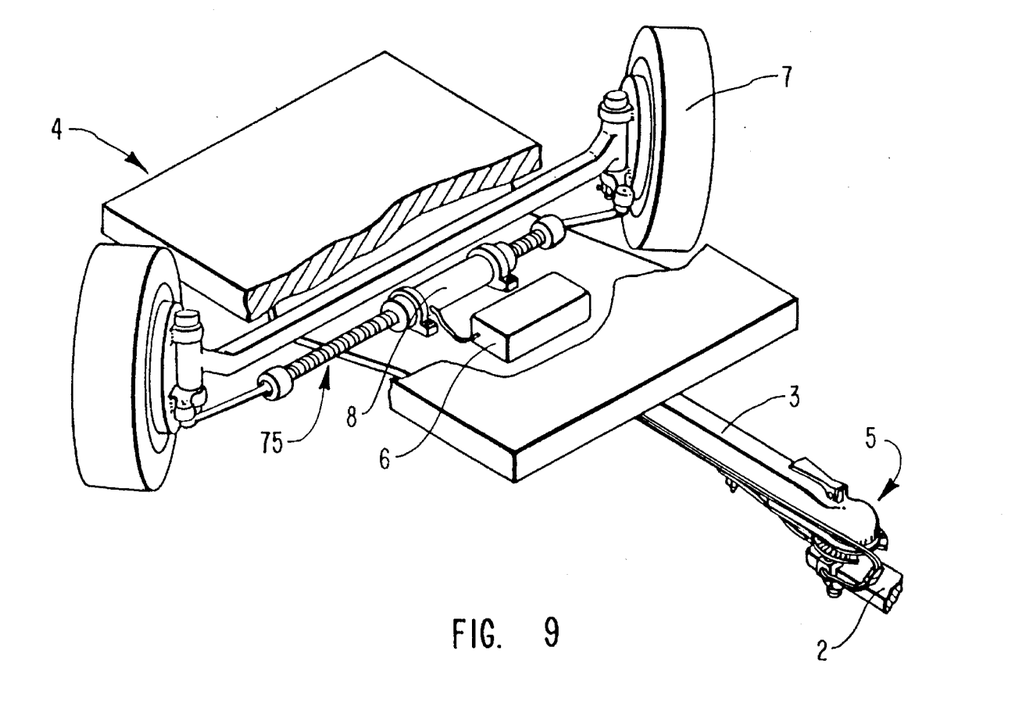
FIG. 9 depicts the trailer with hitch angle sensor, steering controller, and steering actuator units shown, employing an electric motor concentric about a worm gear shaft.

FIG. 9 depicts an alternative embodiment of the invention. FIG. 9 is the same as FIG. 8 except that a motor 8 concentric about the worm gear shaft 75 is used in place of a conventional electric motor 8. This achieves the advantage of compactness. Many other mechanical implementations of our invention can be practiced.

In this embodiment of our invention the above-described components can be as follows:

(1) Sensors 46 and 80 can be Accelerometers, LVDT, RVDT, potentiometers, gyroscopes, electron-beam yaw-sensors, etc.

(2) Controllers 6 can be a microprocessor.

(3) Observer 6 can be a Kalman filter. More generally, the observer can be an observer, filter, state reconstructor or other similar means (all of which are intended to be encompassed by the word observer as used herein).

(4) Comparator 81 can be operational amplifier or instrument amplifier.

(5) Servo compensator 55 can be a network of operational amplifiers.

(6) Amplifier 57 can be a standard servo-amplifier.

(7) Electric motor 8 can be a brushless (or brushed) D.C. motor.

Figure 12:
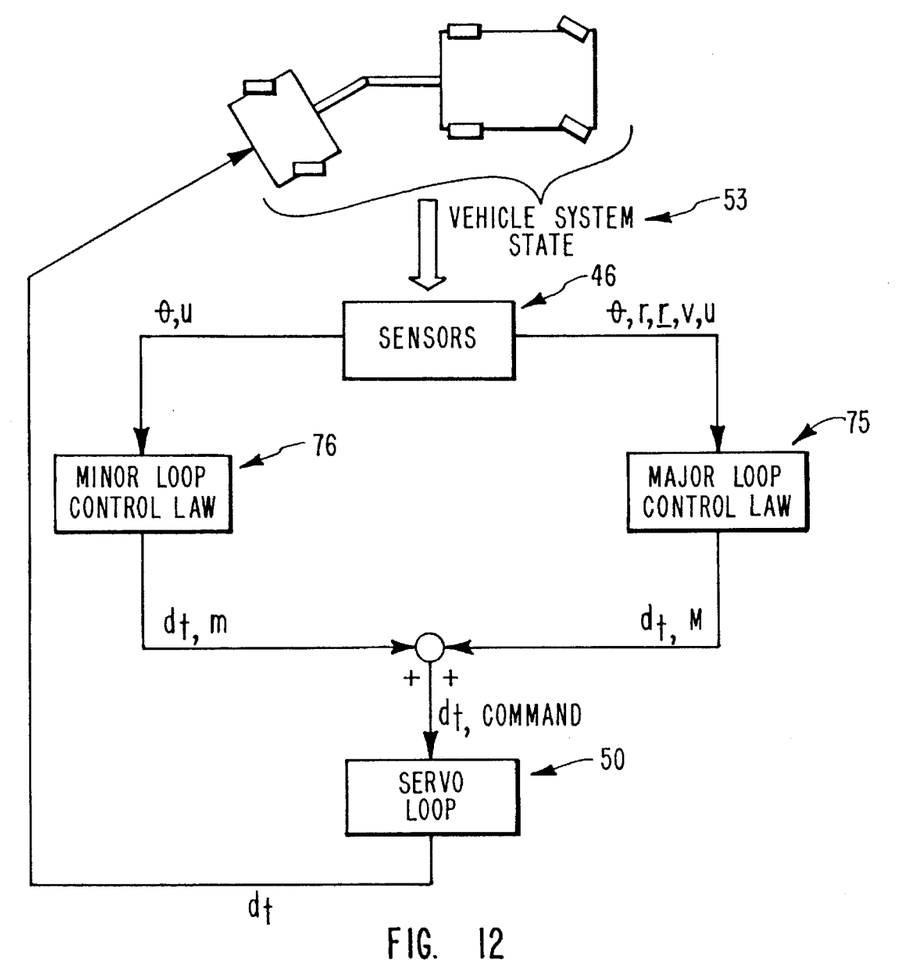
FIG. 12 depicts the major and minor control loops of the forward motion steering control system.

FIG. 12 illustrates the details of the major and minor control loops which are used in this embodiment of our invention by controller 6 to calculate $d_{t,command}$ as described below. The vehicle system state 53 is measured by sensors 46. The minor loop control law uses $\Theta$ and u to calculate a minor loop steering command $d_{t,m}$ based on the equation $d_{t,m}=f(u) \Theta$. The major loop control law uses $\Theta$, r, $\underline{r}$, v, and u to calculate a major loop steering command $d_{t,M}$ based on the equation $d_{t,M}=-gB_t^*P(X_1-X_r)$. A steering command $d_{t,command}$ is calculated by adding the major and minor loop commands. Internal to the servo loop the steering angles $d_{t,command}$ are compared to the actual steering angles $d_t$ to determine a steering error. The servo loop 50 acts on the steering error to bring about the desired steering angles (i.e. the new $d_t$) for the trailer wheels.

The equations used by the forward motion steering control system to determine steering commands $d_{t,m}$ and $d_{t,M}$ are based on the variables and parameters described above. In terms of these variables and parameters, the equations of motion describing the movement of the vehicle system are:

$$\overset{\circ}{u}(m + \underline{m}) - \underline{rmh}\sin\theta =$$

$$\Sigma F_{1i}\cos d_i - \Sigma F_{2i}\sin d_i - \cos\theta(\Sigma \underline{F}_{2i}\sin \underline{d}_i - \Sigma \underline{F}_{1i}\cos \underline{d}_i) +$$

$$\sin\theta(\Sigma \underline{F}_{1i}\sin \underline{d}_i + \Sigma \underline{F}_{2i}\cos \underline{d}_i)(m + \underline{m})vr + \underline{m}hr^2 - \underline{m}hr^2\cos\theta;$$

$$\overset{\circ}{v}(m + \underline{m}) + \underline{m}h\overset{\circ}{r} - \underline{rmh}\cos\theta =$$

$$\Sigma F_{1i}\sin d_i + \Sigma F_{2i}\cos d_i + \sin\theta(\Sigma \underline{F}_{2i}\sin \underline{d}_i - \Sigma \underline{F}_{1i}\cos \underline{d}_i) +$$

$$\cos\theta(\Sigma \underline{F}_{1i}\sin \underline{d}_i + \Sigma \underline{F}_{2i}\cos \underline{d}_i) - (m + \underline{m})ur + \underline{m}hr^2\sin\theta;$$

$$\overset{\circ}{v}mh + \overset{\circ}{r}(I + \underline{m}h^2) - \underline{rmh}h\cos\theta =$$

$$\Sigma F_{1i}l_i\sin d_i + \Sigma F_{2i}l_i\cos d_i - \Sigma F_{1i}t_i\cos d_i +$$

$$\Sigma F_{2i}t_i\sin d_i + h\sin\theta(\Sigma \underline{F}_{2i}\sin \underline{d}_i - \Sigma \underline{F}_{1i}\cos \underline{d}_i) +$$

$$h\cos\theta(\Sigma \underline{F}_{1i}\sin \underline{d}_i + \Sigma \underline{F}_{2i}\cos \underline{d}_i) - \underline{m}hur + \underline{m}hhr^2\sin\theta;$$

$$-\overset{\circ}{u}(\underline{m}h\sin\theta) - \overset{\circ}{v}(\underline{m}h\cos\theta) - \overset{\circ}{r}(\underline{m}hh\cos\theta) + \overset{\circ}{\underline{r}}(\underline{I} + h^2\underline{m}) =$$

$$-\Sigma \underline{F}_{1i}l_i\cos\underline{d}_i + \Sigma \underline{F}_{2i}l_i\sin\underline{d}_i + \Sigma \underline{F}_{1i}l_i\sin\underline{d}_i +$$

$$\Sigma \underline{F}_{2i}l_i\cos\underline{d}_i - h(\Sigma \underline{F}_{1i}\sin\underline{d}_i + \Sigma \underline{F}_{2i}\cos\underline{d}_i) +$$

$$ru\underline{m}h\cos\theta - h\underline{m}vr\sin\theta - r^2hh\underline{m}\sin\theta;$$

and $$\overset{\circ}{\theta} = r - \underline{r}$$

In these equations summations that include underlined variables are only over the trailer variables. These five equations can be expressed in state-space form as $$L = \begin{bmatrix} m + \underline{m} & \underline{m}h & -\underline{m}h & 0 \\ \underline{m}h & I + \underline{m}h^2 & -\underline{m}hh & 0 \\ -\underline{m}h & -\underline{m}hh & \underline{I} + \underline{m}h2 & 0 \\ 0 & 0 & 0 & 1 \end{bmatrix}$$

$$R = \begin{bmatrix} (\Sigma c_i + \Sigma \underline{c}_i)/u & (\Sigma c_i l_i + \Sigma \underline{c}_i h)/u - (m+\underline{m})u & \Sigma \underline{c}_i(\underline{l}_i - \underline{h})/u & \Sigma \underline{c}_i \\ (\Sigma c_i l_i + h\Sigma \underline{c}_i)/u & (\Sigma c_i l_i^2 \Sigma \underline{c}_i h^2)/u - \underline{m}hu & h\Sigma \underline{c}_i(\underline{l}_i - \underline{h})/u & h\Sigma \underline{c}_i \\ \Sigma \underline{c}_i l_i - h\Sigma \underline{c}_i)/u & h\Sigma \underline{c}_i(\underline{l}_i - \underline{h})/u + u\underline{m}h & \Sigma \underline{c}_i(\underline{l}_i - \underline{h})^2/u & \Sigma \underline{c}_i(\underline{l}_i - \underline{h}) \\ 0 & 1 & -1 & 0 \end{bmatrix}$$

$$R_c = \begin{bmatrix} -c_1 & -c_2 & -c_3 & -c_4 \\ -c_1 l_1 & -c_2 l_2 & -c_3 l_3 & -c_4 l_4 \\ 0 & 0 & 0 & 0 \\ 0 & 0 & 0 & 0 \end{bmatrix}$$

$$R_t = \begin{bmatrix} -\underline{c}_1 & -\underline{c}_2 \\ -h\underline{c}_1 & -h\underline{c}_2 \\ (\underline{h} - \underline{l}_1)\underline{c}_1 & (\underline{h} - \underline{l}_2)\underline{c}_2 \\ 0 & 0 \end{bmatrix}$$

$$M(\Theta) \overset{\circ}{x} = f(x)$$

where $M(\Theta)$ is an invertible 5 by 5 matrix, and $f(x)$ is a 5 by 1 vector valued function of the chosen vehicle system state x, which, in this embodiment of our invention, is defined by $u, v, r, \underline{r}$, and $\Theta$. As is well known to persons of ordinary skill in the art, the choice of the vehicle system state is not unique. Equivalent choices for the vehicle system state can be obtained by transformations of our choice of vehicle system state. Such equivalents are deemed to be within the scope of our invention.

The above equations can be linearized by letting $\cos\Theta=1$ and $\sin\Theta=\Theta$, by neglecting products of small angles, and by treating the longitudinal velocity u as constant. Tire forces are linearized by letting $$F_{2i} = C_i \alpha_i$$

$$\underline{F}_{2i} = \underline{C}_i \underline{\alpha}_i$$

where $c_i$ and $\underline{c}_i$ are the tire cornering stiffness of the tow vehicle wheels and the trailer wheels respectively and where for the tow vehicle 1:

$$\alpha_i = ((v + rl_i)/u) - d_i$$

and for the trailer 4:

$$\underline{\alpha}_i = ((v + hr + (\underline{l}_i - \underline{h})\underline{r})/u) + \Theta - \underline{d}_i$$

The effects of longitudinal wheel-slip on cornering force are neglected, self aligning torques are neglected, and camber effects are neglected.

Applying these steps to the preceding equations $$L \overset{\circ}{x} = Rx_1 + R_c d_c + R_t d_t$$

where: $x_1$ is a column vector of the "linear" states $(v, r, \underline{r}, \Theta)$. $d_c$ is a column vector of the tow vehicle steering angles. $d_t$ is a column vector of the trailer steering angles. The components of L, R, $R_c$, and $R_t$ are as follows:

Solving the previous equation yields $$\overset{\circ}{x} = Ax_1 + B_c d_c + B_t d_t$$

where $A = L^{-1}R$ $B_c = L^{-1}R_c$ $B_t = L^{-1}R_t$

The source for the development of these equations is Ellis, J. R., *Vehicle Dynamics*, London Business Books, 1966, which publication is incorporated by reference herein.

The benefit provided by the major loop control law is enhanced vehicle system stability (i.e. less swaying of the trailer). The major loop control law used in preferred embodiment of our invention is used to calculate $d_{t,M}$ and is as follows:

$$d_{t,M} = -gB_t * P(x_1 - x_r)$$

where
- $x_r$ is a reference trajectory. $x_r$ is described fully below. It serves as the desired reference state for the vehicle system.
- $g=g(x)>0$ is a diagonal matrix of arbitrary positive scaling functions, and
- $P=P^*>0$ satisfies the Lyapunov Equation
- $PA+A^*P=-C^*WC$ for $(C,A)$ observable.

Note that a superscript asterisk designates the transpose of a matrix. The stability and effectiveness of the control is guaranteed by the Lyupunov Theory. The control law reduces the cost function:

$$e_0^* P e_0 = \int_0^\infty e(\sigma)^* C^* W C e(\sigma) d\sigma$$

where $\ominus$ is the trajectory error, $x_1-x_r$. The W matrix is a positive definite weighting matrix. By adjusting the magnitude of the elements of W one can tune and shape the performance of the controller.

The scaling functions on the diagonal of g can take many forms as long as they remain positive. This freedom allows for bang-bang, saturating and other nonlinear controls.

The gain matrix P depends on A which in turn depends on u. To avoid continuously computing P as the vehicle speed changes, the elements of $B_t^*P$ can be computed off-line, curve-fit as polynomial functions of speed, and then provided to the controller in the form of polynomial coefficients.

The matrix C selects the combinations of the states that appear in the cost function. The matrix W sets the relative weighting. Common sense must be applied in selecting the cost function weightings. Often the trailer steering has little authority over the tow vehicle, so the weighting should not emphasize control over the tow vehicle. Placing heavy weights on tow vehicle states in the cost function could over-tax the trailer steering system and jeopardize the trailer's stability. This situation can be avoided by emphasizing the trailer's variables in the penalty function.

Other methods (e.g. equations) can be used to calculate $d_{t,M}$. For example, pole-placement techniques or linear quadratic regulators can be used to derive effective equations for $d_{t,M}$.

The reference state $x_r$ is needed for the calculation of $d_{t,M}$ and is the desired vehicle system state. The performance of the controller is heavily influenced by the choice of reference state $x_r$ (i.e. the desired vehicle system state). The controller 6 calculates the desired reference state. One method for generating reference states is to use a "dynamic" reference model such as $$\dot{x}_r = A x_r + B_c d_c + B_t d_{t,m}$$

But, this method requires real-time integration of this equation mother possible method for generating reference states uses a "steady state" reference model such as $$X_r = -A^{-1}(B_c d_c + B_t d_{t,m})$$

which is obtained by solving the dynamic reference model above for the steady state value of $x_r$.

The second method is more suitable for real-time control since the elements of $-A^{-1}B_c$ or $-A^{-1}B_t$ can be computed off-line and curve fit by polynomial functions of speed. The problem with this method is that the reference state jumps with changes in $d_c$. No allowance is made for the time required for the system to reach steady state. This problem can be overcome by substituting a low-pass filtered $d_c$ (call this $d_{c,f}$) into the steady state reference model shown above, yielding $$x_r = -A^{-1}(B_c d_{c,f} + B_t d_{t,m}).$$

Experience has shown that a first order filter with a 0.1 second time constant works well. This smooths the reference state transitions and does not create excessive phase lag.

To further minimize phase lag, an adaptive filter can also be used, e.g. of the form where $$k^{n+1} = k_0 + k_1(3 d_c^{n+1} - d_{c,f}^n)$$

and $$k_0 > 0, \ k_1 > 0, \text{ and } k_0 + k_1 < 1$$

$k_1$ is an increasing function of the absolute value of the difference between $d_c$ and $d_{c,f}$ as this difference increases $k_1$ and therefore $k^{n+1}$ increase. This acts to reduce phase lag when rapid motions in $d_c$ occur; as $k^{n+1}$ approaches 1, $d_{c,f}$ approaches $d_c$.

Other methods for calculating the reference state can be employed in the practice of our invention.

Figure 13:
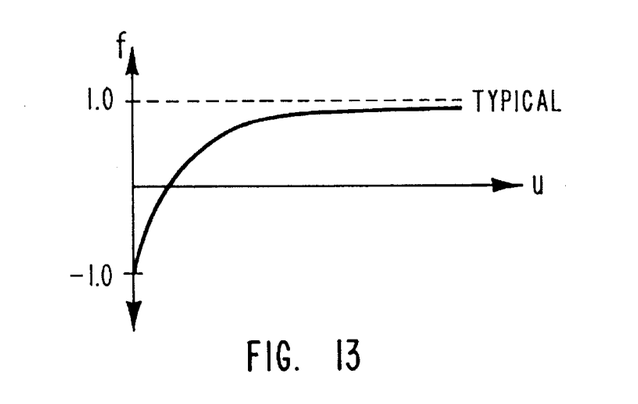
FIG. 13 depicts an example of f(u).

Now, we turn our attention to the minor loop control law. The minor loop utilizes hitch angle $\ominus$ and tow vehicle velocity u to calculate a steering command $d_{t,m}$ for the trailer wheels according to a speed-dependent function of the hitch angle $\ominus$. The benefit of the minor loop is enhanced maneuverability and followability. The minor loop control law has the form $$d_{t,m} = f(u) \ominus$$

where f(u) is a function of tow vehicle velocity u. At low speeds f is negative which improves the followability of the trailer. At higher speeds f is positive which improves the transient response of the trailer especially in lane change maneuvers. The exact values of f(u) need to be established for each tow-vehicle/trailer combination. A typical representation of f(u) is depicted in FIG. 13 and can be derived from analysis and experimentation.

Our invention reads and/or estimates variables u, v, r, $\ominus$, $d_c$, u̇, v̇, ṙ, and $d_t$ ("measured variables") by instrumentation of the vehicle system. Such instrumentation can be, for example, optical velocity sensors, solid state yaw rate sensors, gyroscopes, accelerometers, RVDT, LVDT, potentiometers, etc. All other variables and parameters listed above are either input to the steering control system when the controller is initialized or are calculated by the controller. The measured variables are sent to the controller/observer 6 where the equations above are used to calculate major and minor loop steering commands $d_{t,M}$ and $d_{t,m}$. A total steering command $d_{t,command}$ is calculated by adding the major and minor steering commands as shown in this equation:

$$d_{t,command} = d_{t,m} + d_{t,M}$$

where $d_{t,m}$ and $d_{t,M}$ are the minor and major loop commands respectively. This combined steering command is also limited so as not to exceed the maximum steering range of the steering system mechanism.

When $d_{t,command}$ is generated it is compared to $d_t$ to determine a steering position error. This comparison is done internally to the servo loop. The steering error is sent to the servo compensator. The servo compensator uses this steering error to generate a voltage which is amplified and appears as an electric current to the steering actuator (e.g. electric motor 8). The steering actuator responds to the electric current by adjusting the steering angles $d_t$ by the steering error to the desired $d_{t,command}$. The command may be in the form of a steering angle, electric motor position or a steering position but, in any event, is directly or indirectly representative of the steering angle of the trailer wheel. Our invention uses the steering angle of the trailer wheel.

The process of reading the measured variables from the vehicle system state, calculating a new steering $d_{t,command}$, determining the steering error, generating voltage and electric current, and adjusting the steering angles $d_t$ is accomplished repeatedly (e.g. about 500 times per second). The rate of this repetition can vary widely. For most applications, the minimum rate of performing this process that will still yield a responsive trailer steering control system is about 10 times per second, but the preferred rate is much higher.

Our invention uses digital and analog instrumentation and digital control. Other implementations can use combinations of various other instrumentation and control means. The steering apparatus can be a lead screw with ball bearing channels comprising a recirculating ball and worm assembly powered by an electric motor as shown in FIG. 8. The steering apparatus can be implemented with a motor concentric on the lead screw as shown in FIG. 9 or with independent, I-beam, or other suspension or with rack and pinion or other steering. Note that although both FIGS. 8 and 9 show a two-wheeled trailer, our invention can be used with any trailer having a plurality of wheels and one or more means for steering one or more of those wheels. Trailer 4 can include additional wheels not shown in the appended drawings. For example, the trailer may include an additional set of wheels on a second axel. If these wheels are not steerable then the monitoring of the steering angles of the wheels is accomplished by simply initializing the controller with the constant steering angle $d_i$ for those wheels. If the wheels are steerable they can be controlled by our inventive control system.

In the practice of our invention, the measurements and calculations can be exact or estimates (approximations). For example, raw measurements can be used directly or they can be combined and filtered using a Kalman Filter.

BACKWARD MOTION STEERING CONTROL SYSTEM

FIG. 4 also applies to the backward motion steering control system. Vehicle system again refers to tow vehicle 1 and trailer 4. More generally, much of the information in the preceding description of the forward motion steering control system is applicable to the backward motion control system and, therefore, such information is deemed a part of this description of the backward motion steering control system.

Figure 10:
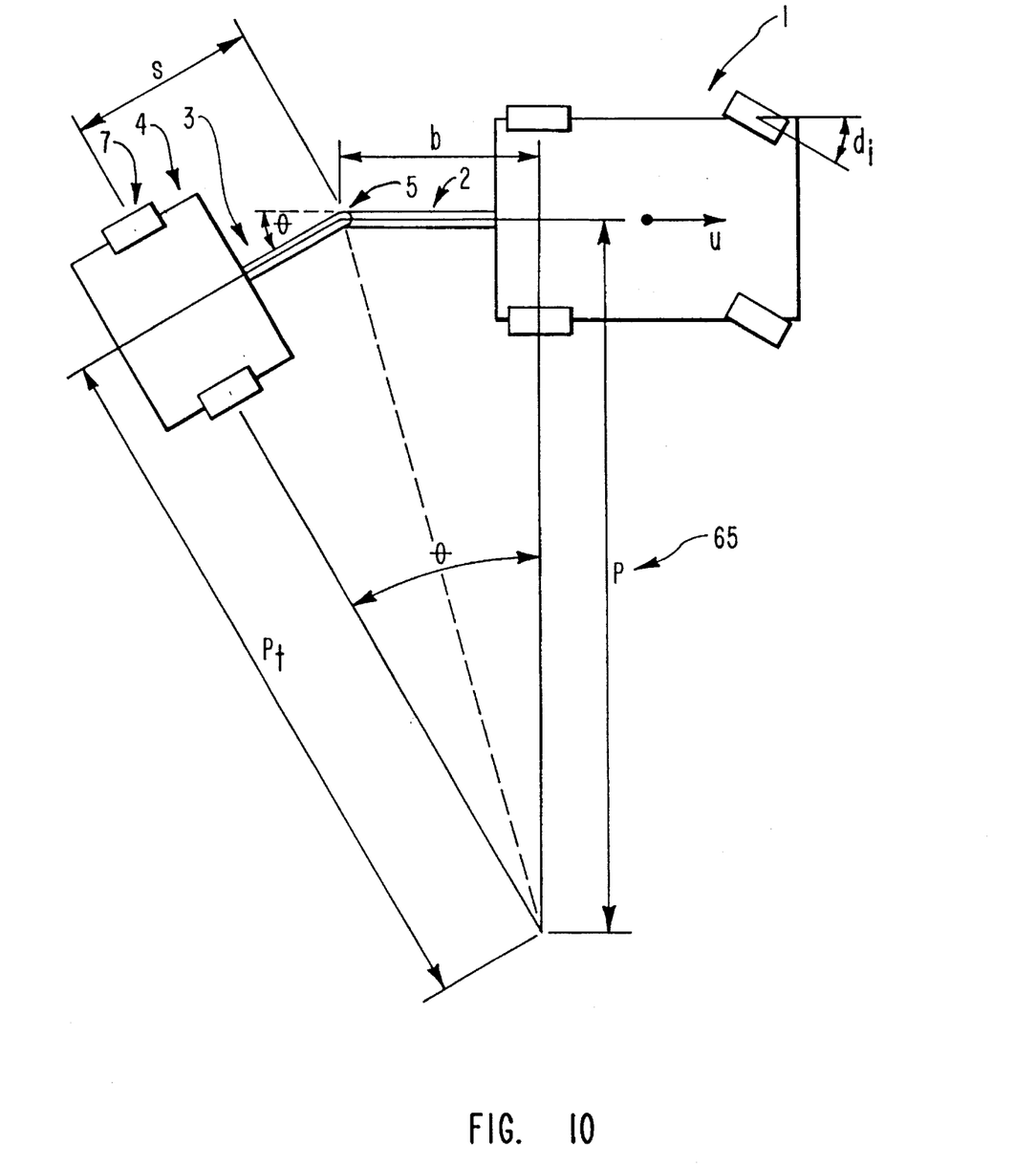
FIG. 10 depicts a variables and parameters used in the backward motion steering control system.

FIG. 10 depicts certain variables and parameters used in the backward motion steering control system. The backward motion steering control system uses a single-input single-output loop utilizing hitch angle $\Theta$ feedback from a hitch angle sensor.

The vehicle response variables representing tow vehicle and trailer dynamics are defined as:
  u—longitudinal velocity of tow vehicle
  $P_t$—radius of curvature of the trailer center
  P—radius of curvature of tow vehicle center
  $r_{ss}$—steady state yaw rate of the tow vehicle
  $\Theta$—hitch angle
  $\underline{u}$—longitudinal velocity of the trailer
  $\underline{r}$—yaw rate of the trailer
The steering variables are defined as:

$d_i$—the steering angle of a tow vehicle wheel i ($d_c$ is the set of all tow vehicle steering angles).
  $d_{t,c}$—final steering command for the trailer wheels (i.e. the desired steering angles)
  $d_{t_i}$—the steering angle of a trailer wheel i ($d_t$ is the set of all trailer steering angles)

The following vehicle system parameters are defined as:
  b—the distance between the trailer hitch and the tow vehicle rear axle
  s—the longitudinal distance from the trailer wheels to the trailer hitch $l_i$, $t_i$, h, m, I, $\underline{l}_i$, $\underline{t}_i$, $\underline{h}$, $\underline{m}$, and $\underline{I}$ have the same meaning as described previously (the sets l, t, $\underline{l}$, and $\underline{t}$ also have the same meaning as described previously).

Cornering stiffness $c_i$ or $\underline{c}_i$ for each wheel; and the sets c and $\underline{c}$ retain the same meaning as described previously.

Figure 11:
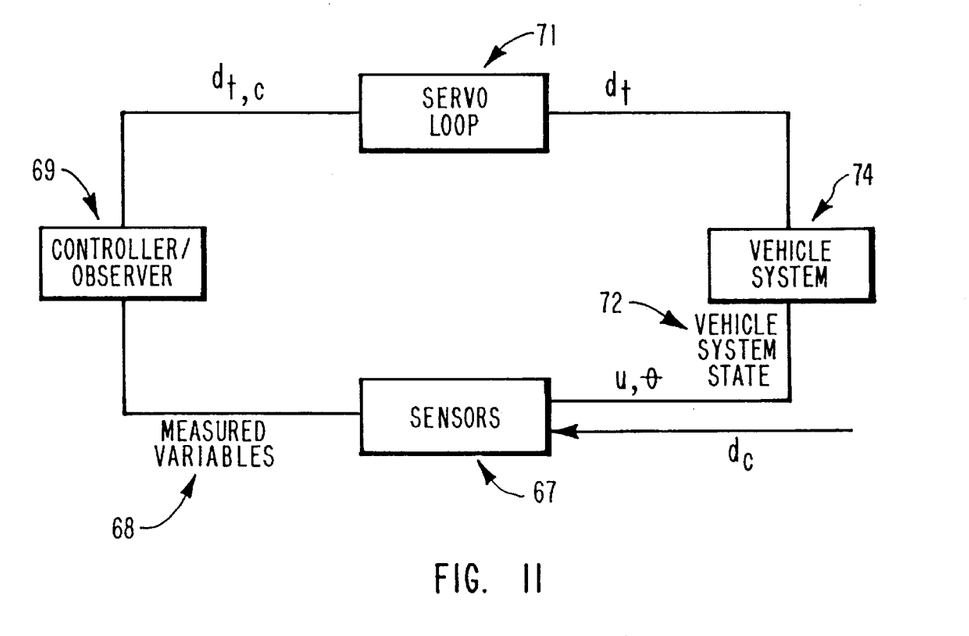
FIG. 11 depicts a control loop for the backward motion steering control system.

FIG. 11 depicts the operation of the backward motion steering system. Sensors monitor u, $\Theta$, and $d_c$, (measured variables 68) from the vehicle system state 72 and the tow vehicle 1 using sensors 67. The controller/observer 69 uses these variables to calculate desired steering angles $d_{t,c}$. The steering command $d_{t,c}$ is calculated based on the control law described below. The steering command $d_{t,c}$ is intended to cause the actual hitch angle $\Theta$ to move towards a desired reference hitch angle $\Theta_r$. The desired reference hitch angle $\Theta_r$ is calculated by controller/observer 69. The steering command $d_{t,c}$ is sent to the steering servo loop 71. The servo loop 71 can be the same servo loop as used in the forward motion steering control system and shown in FIG. 7. The servo loop 71 adjusts steering angles $d_t$ of the trailer wheels to follow $d_{t,c}$. By repeating the foregoing actions or steps, the actual hitch angle $\Theta$ can be maintained near the desired hitch angle $\Theta_r$ which varies with time (and thereby minimize or prevent jackknifing of the vehicle system as described below). This embodiment of our invention performs these functions repeatedly, e.g. at about 500 times per second. This rate can vary, but for most applications to achieve adequate trailer steering control, the rate should be at least 10 times per second and preferably much higher.

By using the backward motion control system of our invention, drivers can back up at higher speeds with less danger of Jackknifing the vehicle system.

The linearized equations of motion for the backward motion steering system are $$\dot{x} = \tilde{A}x_1 + \tilde{B}_c d_c + \tilde{B}_t d_t$$

where $\tilde{B}_t$, $\tilde{B}_c$, and $\tilde{A}$ are obtained by evaluating A, $B_c$, and $B_t$ (which are described in the description of the forward motion control system) using negative values for u and positive values for each $c_i$ and $\underline{c}_i$. $x_1$ is the linearized vehicle system state.

$\tilde{A}$ is unstable. Its unstable eigenvector is essentially the hitch angle $\Theta$ and the result is jackknifing.

The following control law can be used to stabilize the vehicle system (i.e. to reduce jackknifing):

$$d_{t,c} = k_p(u)(\Theta - \Theta_r(u, d_c)) + k_d(u)\dot{\Theta}$$

where $\Theta_r(u, d_c)$—reference hitch angle that depends on tow-vehicle speed and steering angles $d_c$
  $k_p(u)$—proportional control gain that depends on tow vehicle speed u
  $k_d(u)$—derivative control gain that depends on tow vehicle speed
  $\dot{\Theta}$—rate of change of hitch angle $\Theta$ The control gains $k_p(u)$ and $k_d(u)$ can be found by various means. Linear control techniques can be used by linearizing the vehicle system around the designated reference state (i.e. $\Theta_r$). For example root-locus techniques or Bode techniques can be used to find $K_p$ and $K_d$ (for several values of u). The formulas for $K_p$ and $K_d$ can be found by curve fitting the values of $K_p$ and $K_d$ found at the several values of u. It is also possible to include an integral gain or to use lead/lag compensation.

The variables u, $d_c$, and $\Theta$ are used to calculate an equilibrium hitch angle $\Theta_r$. The control gains $k_p(u)$ and $k_d(u)$ can be found in tables in the controller's memory and a steering command $d_{t,c}$ is calculated and executed.

The reference hitch angle $\Theta_r$ is the equilibrium hitch angle of the backing trailer. It is found by solving the following equation for steady state: $\dot{x} = \tilde{A}x_1 + \tilde{B}_c d_c$. The result is: $x_r = -\tilde{A}^{-1} \tilde{B}_c d_c$. Hence $x_r = x_i$ when $\dot{x} = 0$.

$X_r$ has four components which represent the equilibrium values of v, r, $\underline{r}$, and $\Theta$. The fourth component of $x_r$ provides the equilibrium hitch angle $\Theta_r$, but it represents an unstable equilibrium (like a pencil balanced on its tip). The proposed control law, shown above for stabilizing the vehicle system, makes it a stable equilibrium and the driver need not steer precisely to maintain it.

This choice of reference angle $\Theta_r$ is significant. The hitch angle will remain small and the trailer will not jackknife. Furthermore, skilled and practiced drivers often maintain this equilibrium angle when backing-up and will find the vehicle-trailer behavior familiar. There are times when skilled drivers want to exploit the unstable behavior of trailers during backing. To allow for these events the system can be equipped with manual override. The driver can either lock the wheels straight ahead or adjust them to some angle. A manual override can be implemented by breaking the control loop shown in FIG. 11. Instead of having the controller/observer generating $d_{t,c}$, a manually generated command can be injected into the servo loop 71. This manually generated command can be generated from a potentiometer or other conventional means.

Because the steering angles $d_t$ of the trailer are limited, there are some conditions under which the controller cannot stabilize the vehicle system. Simple kinematic analysis indicates that the magnitude of the error ($\Theta_r - \Theta$) in hitch angle must remain below the maximum magnitude of the steering angle of the trailer wheels. Moreover, if there is significant longitudinal acceleration the full nonlinear equations must be considered. The current results apply only if the longitudinal acceleration is small as is typically the case when backing a trailer.

An impediment to the practical use of this controller is the implied requirement for instrumenting the tow vehicle. In accordance with the equation given above for $\Theta_r$, the reference angle $\Theta_r$ is a function of the tow vehicle speed u and the steering angles $d_c$ of the tow vehicle. This seems to imply that a prospective tow vehicle needs to be instrumented to tow a trailer equipped with the proposed steering system. But $\Theta_r$ can be estimated from vehicle system conditions other than variables descriptive of the dynamics of the tow vehicle (and, therefore, the calculation of $d_{t,c}$ by the controller can be based on the estimate of $\Theta_r$). This makes application of the proposed backward motion controller easier. A set of assertions is now made that leads to this result.

1. At low speeds (such as during backing-up) the slip-angles of the tires are negligible. The velocity of the center of the tire contact patch can be assumed to align with the longitudinal direction of the wheel.

2. At low speeds the tow vehicle is almost always in steady state, its transient behavior is negligible. The measured yaw rate of the tow vehicle r can be treated as the steady state yaw rate $r_{ss}$.

3. The radius of curvature of the tow vehicle center is P as shown on FIG. 10.

4. The radius of curvature of the trailer center can be found from FIG. 10 as $$P_t^2 + s^2 = p^2 + b^2$$

5. The reference hitch angle $\Theta_r$ can be found from FIG. 10 as $$\Theta_r = \tan^{-1}(s/P_t) + \tan^{-1}(b/P)$$

6. The steady state yaw rate of the tow vehicle $r_{ss}$ is $$r_{ss} = u/P$$

7. The yaw rate of the trailer $\underline{r}$ and the yaw rate of the tow vehicle, r, are related by $$\dot{\theta} = r - \underline{r} \approx r_{ss} - \underline{r}$$

8. The longitudinal speed of the trailer $\underline{u}$ is related to the longitudinal speed of the tow vehicle u by $$\underline{u}^2 + (\underline{r}s)^2 \approx u^2 + (rb)^2$$

This relationship was obtained by equating the velocity of the hitch point in the trailer reference frame to the velocity of the hitch point in the tow vehicle reference frame.

$$\begin{aligned}
\theta_r &= \tan^{-1} s/P_t + \tan^{-1} b/P \\
&= \tan_{-1} s/\sqrt{(P^2 + b^2 - s^2)} + \tan^{-1} b/P \\
&= \tan^{-1} sr/\sqrt{(u^2 - r^2(s^2 - b^2))} + \tan^{-1} br/u \\
&= \tan^{-1} s(\underline{r} + \dot{\theta})/\sqrt{(u^2 - (\underline{r} + \dot{\theta})^2(s^2 - b^2))} + \\
&\quad \tan^{-1} b(\underline{r} + \dot{\theta})/u \\
&= \tan^{-1} s(\underline{r} + \dot{\theta})/\sqrt{(\underline{u}^2 + (\underline{r}s)^2 - (\underline{r} + \dot{\theta})^2 s^2)} + \\
&\quad \tan^{-1} b(\underline{r} + \dot{\theta})/\sqrt{(\underline{u}^2 + (\underline{r}s)^2 - (\underline{r} + \dot{\theta})^2 b^2)}
\end{aligned}$$

Based on the preceding assertions, the following equation illustrates that:

$$\theta_r = -\{\tan^{-1} s(\underline{r} + \dot{\theta})/\sqrt{(\underline{u}^2 + (\underline{r}s)^2 - (\underline{r} + \dot{\theta})^2 s^2)} +$$

$$\tan^{-1} b(\underline{r} + \dot{\theta})/\sqrt{(\underline{u}^2 + (\underline{r}s)^2 - (\underline{r} + \dot{\theta})^2 b^2)}\} \{\text{sign}(\underline{r} + \dot{\theta})\}$$

where the trailer's yaw rate $\underline{r}$, trailer's forward speed $\underline{u}$, drawbar length s, and hitch angle velocity $\dot{\theta}$, are sufficient to estimate $\Theta_r$. The only tow-vehicle parameter required is b, the distance between the hitch and the rear axle of the trailer. No instrumentation of the tow vehicle is required (b can be determined by a simple measurement and input as a parameter into controller/observer 69). In essence, the velocity of the hitch angle $\Theta$ and the trailer yaw rate velocity $\underline{r}$ are used to determine the tow vehicle yaw rate, and the velocity of the trailer and the hitch angle $\Theta$ are used to determine the tow vehicle velocity.

Other methods for calculating (estimating) the reference hitch angle $\Theta_r$ can be used in the practice of our invention.

The foregoing description of our invention so fully reveals the general nature of the invention that others can readily modify such invention and/or adapt it for various applications without departing from its generic concept, and therefore such adaptations and modifications should be and are intended to be comprehended within the meaning and range of equivalents to the following claims which claims define subject matter regarded by us to be our invention. Usage in the claims of variables, parameters and other designations used in the foregoing description (including drawings) of our invention, shall have the same meaning in the claims.

We claim:

1. A hitch angle sensor assembly for measuring a hitch angle θ between a tow vehicle having a joint and a trailer rotatably joined to the tow vehicle at the joint, said tow vehicle having an XYZ coordinate system and said trailer having an xyz coordinate system, said hitch angle sensor assembly comprising:

(a) a hitch ball having a shaft at its first end, a ball at its second end, and a channeled area located between said first and second ends, said channeled area comprising antifriction material, and said hitch ball being installable on a receiver, (b) an angle indicator having an outer angle indicator disk and an inner receptacle, said outer angle indicator disk having an opening to permit said inner receptacle to be placed adjacent said channeled area, said inner receptacle comprising antifriction material and being configured so that said inner receptacle can rotate about said channeled area and about the Z axis during a change in hitch angle θ, said outer angle indicator disk being configured to indicate a hitch angle θ, (c) an elongate strap having a first end and a second end, said elongate strap first end being connected to said angle indicator and said elongate strap second end being connectable to a trailer tongue, said strap being rigid in the xy plane in order to facilitate accurate measurement of a hitch angle θ, and said strap being more rigid in the xy plane than in either the xz or yz planes, and (d) a sensor adapted to read a hitch angle θ from said outer angle indicator ring;

wherein said strap and angle indicator are constructed so that they are capable of only rotating about the Z-axis;

wherein said strap is flexible in bending about the y-axis, thereby allowing pitching movements to occur between the tow vehicle and the trailer without binding and without causing rotation of said angle indicator about the Z-axis;

wherein said strap is flexible in twisting about the x-axis thereby allowing rolling movements between the tow vehicle and the trailer to occur without binding and without causing rotation of said indicator disk about the Z-axis;

wherein said strap is rigid about the z-axis; and wherein said strap causes said indicator disk to return to a θ=0 position whenever the x-axis lies in the XZ plane.

2. A hitch angle sensor assembly as recited in claim 1 wherein said angle indicator is C-shaped.

3. A hitch angle sensor assembly for measuring a hitch angle θ between a tow vehicle having a joint and a trailer rotatably joined to the tow vehicle at the joint, said tow vehicle having an XYZ coordinate system and said trailer having an xyz coordinate system, said hitch angle sensor assembly comprising:

(a) a hitch ball having a shaft at its first end and a ball at its second end, (b) a cylindrical spacer having an inner orifice and an outer surface, said inner orifice being of a physical configuration that it is installable about said shaft, (c) an angle indicator having an outer angle indicator disk and a circular inner orifice, said circular inner orifice comprising antifriction material and being configured so it is installable about the outer surface of said cylindrical spacer so that said angle indicator can rotate about the Z-axis during a change in hitch angle θ, said outer angle indicator disk being configured to indicate a hitch angle θ, (d) an elongate strap having a first end and a second end, said elongate strap first end being connected to said angle indicator and said elongate strap second end being connectable to a trailer tongue, said strap second end having a slot in it to permit said strap to slide with respect to a trailer tongue to which it is attached in order to accomodate pitching movements between a tow vehicle and a trailer, and said strap being rigid in the xy plane in order to facilitate accurate measurement of a hitch angle θ, and (c) a sensor adapted to read a hitch angle θ from said outer angle indicator disk;

wherein said strap and angle indicator are constructed so that said angle indicator is capable of rotating only about the Z-axis;

wherein said strap is flexible in bending about the y-axis thereby allowing pitching movements between the trailer and the tow vehicle to occur without binding and without causing rotation of said indicator disk about the Z-axis;

wherein said strap is flexible in twisting about the x-axis thereby allowing rolling movements between the trailer and the tow vehicle to occur without binding and without causing rotation of said indicator disk about the Z-axis;

wherein said strap is rigid about the z-axis; and wherein said strap causes said indicator disk to return to a θ=0 position whenever the x-axis lies in the XZ plane.

* * * * *